(12) United States Patent
Carter

(10) Patent No.: US 7,305,495 B2
(45) Date of Patent: Dec. 4, 2007

(54) DYNAMIC LOADING OF PROTOCOL STACKS UNDER SIGNALING CONTROL

(75) Inventor: George E. Carter, Santa Clara, CA (US)

(73) Assignee: Siemens Communications, Inc., Boca Raton, FL (US)

(*) Notice: Subject to any disclaimer, the term of this patent is extended or adjusted under 35 U.S.C. 154(b) by 685 days.

(21) Appl. No.: 09/809,444

(22) Filed: Mar. 14, 2001

(65) Prior Publication Data

US 2002/0143962 A1    Oct. 3, 2002

(51) Int. Cl.
G06F 9/24 (2006.01)
G06F 9/445 (2006.01)
G06F 15/177 (2006.01)

(52) U.S. Cl. .................. 710/11; 710/8; 713/1; 709/230

(58) Field of Classification Search ................ 709/220, 709/222, 249, 250, 217, 230; 370/465, 389
See application file for complete search history.

(56) References Cited

U.S. PATENT DOCUMENTS

| | | | |
|---|---|---|---|
| 5,265,239 A * | 11/1993 | Ardolino .................... 709/217 |
| 5,317,568 A | 5/1994 | Bixby et al. ................ 370/85.6 |
| 5,473,608 A | 12/1995 | Gagne et al. ............ 370/85.13 |
| 5,517,622 A | 5/1996 | Ivanoff et al. ......... 395/200.13 |
| 5,613,096 A | 3/1997 | Danknick .................... 395/500 |
| 5,640,394 A * | 6/1997 | Schrier et al. .............. 370/389 |
| 5,699,350 A | 12/1997 | Kraslavsky .................. 370/254 |
| 5,826,027 A * | 10/1998 | Pedersen et al. ............ 709/221 |
| 6,009,274 A * | 12/1999 | Fletcher et al. ............. 717/173 |
| 6,032,154 A * | 2/2000 | Coleman et al. ......... 707/104.1 |
| 6,111,866 A | 8/2000 | Kweon et al. ............... 370/335 |
| 6,229,809 B1 * | 5/2001 | Murphy et al. ............. 370/401 |
| 6,349,337 B1 * | 2/2002 | Parsons et al. ............. 709/227 |
| 6,535,927 B1 * | 3/2003 | Kim ........................... 709/249 |
| 2003/0140153 A1 * | 7/2003 | Lawrence ................... 709/230 |

* cited by examiner

*Primary Examiner*—Ilwoo Park

(57) ABSTRACT

Techniques for dynamically loading protocol stacks under signaling control (e.g., a message) are provided. A method of dynamically loading protocol stacks includes the sending of a message to load a protocol stack. If the protocol stack cannot be loaded, the method includes unloading a different protocol stack (such as an unused protocol stack) so that the desired protocol stack can be loaded.

29 Claims, 8 Drawing Sheets

DYNAMIC LOADING OF PROTOCOL STACKS UNDER SIGNALING CONTROL

BACKGROUND OF THE INVENTION

The present invention relates to coordinating protocol stacks for computer systems or electronic devices. More particularly, the invention relates to dynamically loading and unloading of protocol stacks under signaling control.

Protocol stacks are the hierarchy of protocols that allow computers and devices to communicate over a network. These networking protocol stacks have traditionally been statically loaded. That is, once loaded into memory, the protocol stacks will typically remain loaded in memory until they are explicitly unloaded by a user. The static loading of protocol stacks can be acceptable in some environments, but there are an increasing number of environments and situations where the static loading of protocol stacks provides less than desirable results.

As a first example, smaller mobile devices such as cell phones and personal digital assistants (PDAs) are becoming more and more popular. Although including many of the same components as their larger, less mobile brethren, these mobile devices usually have fewer resources such as memory in which the protocol stacks are loaded. Additionally, the smaller mobile devices often need to run operating system vendor applications that use non-sharable protocol stacks while periodically needing to use that same stack for other purposes. Thus, statically loading of protocol stacks can be troublesome on devices, such as smaller mobile devices, that are resource limited.

In order to address this resource constraints problem, what is usually done is to limit the number or capability of the applications that are supported on the platform to a level that never exceeds the available memory when all the protocol stacks are loaded. In some cases, a more costly model of the device, which includes greater memory and possibly the applications to take advantage of this memory, may be introduced. In still other cases, the ability to add plug-in extra-cost memory to a mobility platform may be provided. The major disadvantage to these solutions is that at any given price point, the functionality that can be offered to customers is less than that which could be achieved if memory were used more efficiently.

Another situation where static loading of protocol stacks can result in less than desirable results is when one attempts to share non-sharable protocol stacks. Non-sharable protocol stacks are stacks that either cannot be loaded or used or are not designed to be loaded or used at the same time, typically by different applications. For example, a company's own application may use some of the same protocol stacks as Microsoft's NetMeeting. However, the protocol stacks in NetMeeting may not be designed to be shared in this manner. What is typically done to alleviate this problem of sharing non-sharable protocol stacks is that the users switch between applications by manually unloading the protocol stacks of one application and then loading the protocol stacks of the other application. Depending on the applications, the protocol stacks can be unloaded manually or automatically when the application is exited.

In theory, the problem of sharing non-sharable protocol stacks can also be solved by integrating into a single application all the needed functionality so there is no need to load a potentially conflicting application. The goal of providing all the needed functionality is difficult to achieve for single users and even harder for large groups that may want a very diverse set of utilities. Alternatively, one could only purchase applications that do not have protocol stack sharing restrictions. This may be impractical as it limits one's choices of applications and results in higher resource utilization such as memory. Finally, it is possible for the vendor to support truly shared use of its protocol stacks, both by its own graphical user interface (GUI) and by programmatic callers. However, most vendors, even the largest and most successful, usually do not invest the extra effort required to make this solution work.

SUMMARY OF THE INVENTION

The present invention provides innovative techniques for dynamically loading and unloading protocol stacks, typically under signaling control (e.g., a message). In general, a message can be sent to load a protocol stack. If the protocol stack cannot be loaded for any number of reasons, a different protocol stack (such as an unused protocol stack) is unloaded so that the desired protocol stack can be loaded. In this manner, the invention may provide advantages that memory on small mobility devices is more efficiently utilized, non-sharable protocol stacks can be easily shared, and the like. Some embodiments of the invention are described below.

In one embodiment, the invention provides a computer-implemented method of dynamically loading protocol stacks. A message to load a first protocol stack is received and it is determined whether the first protocol stack can be loaded. If the first protocol stack cannot be initially loaded, a second protocol stack is unloaded. Then, the first protocol stack is loaded. Typically, the first protocol stack cannot be initially loaded because memory was not available or because the first and second protocol stacks are not compatible.

In another embodiment, the invention provides a computer-implemented method of dynamically loading protocol stacks. A first node sends a message to a second node to load a first protocol stack. The second node receives the message to load the first protocol stack and determines whether the first protocol stack can be loaded. If the first protocol stack cannot be initially loaded on the second node, the second node unloads a second protocol stack. Then, the second node loads the first protocol stack. The first and second nodes may be in different devices or the same node in a single device.

Other features and advantages of the invention will become readily apparent upon the review of the following description in association with the accompanying drawings. In the drawings, the same or similar structures will be identified by the same reference numerals.

DETAILED DESCRIPTION OF EMBODIMENTS

In the description that follows, the present invention will be described in reference to embodiments that dynamically load or unload protocol stacks. More specifically, the embodiments will be described in reference to preferred embodiments that coordinate the dynamic loading and unloading of protocols stacks. However, the invention is not limited to the specific applications, architectures or implementations described herein, as the invention can be implemented in different ways. Therefore, the description of the embodiment that follows is for purposes of illustration and not necessarily limitation.

Figure 1:
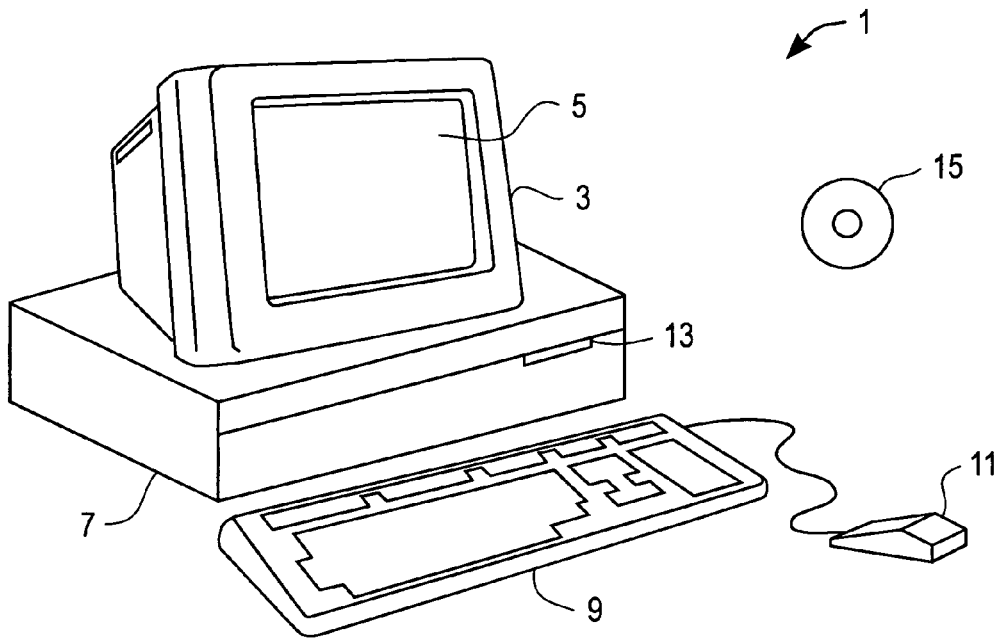
FIG. 1 illustrates an example of a computer system that can be utilized to execute software embodiments of the invention.

FIG. 1 illustrates an example of a computer system that can be used to execute software embodiments of the invention. FIG. 1 shows a computer system 1 that includes a display 3, screen 5, cabinet 7, keyboard 9, and mouse 11. Mouse 11 can have one or more buttons for interacting with a GUI. Cabinet 7 houses a CD-ROM drive 13, system memory and a hard drive (see FIG. 2) which can be utilized to store and retrieve software programs incorporating computer code that implements aspects of the invention, data for use with the invention, and the like. Although CD-ROM 15 is shown as an exemplary computer readable storage medium, other computer readable storage media including floppy disk, tape, flash memory, system memory, and hard drive can be utilized.

Figure 2:
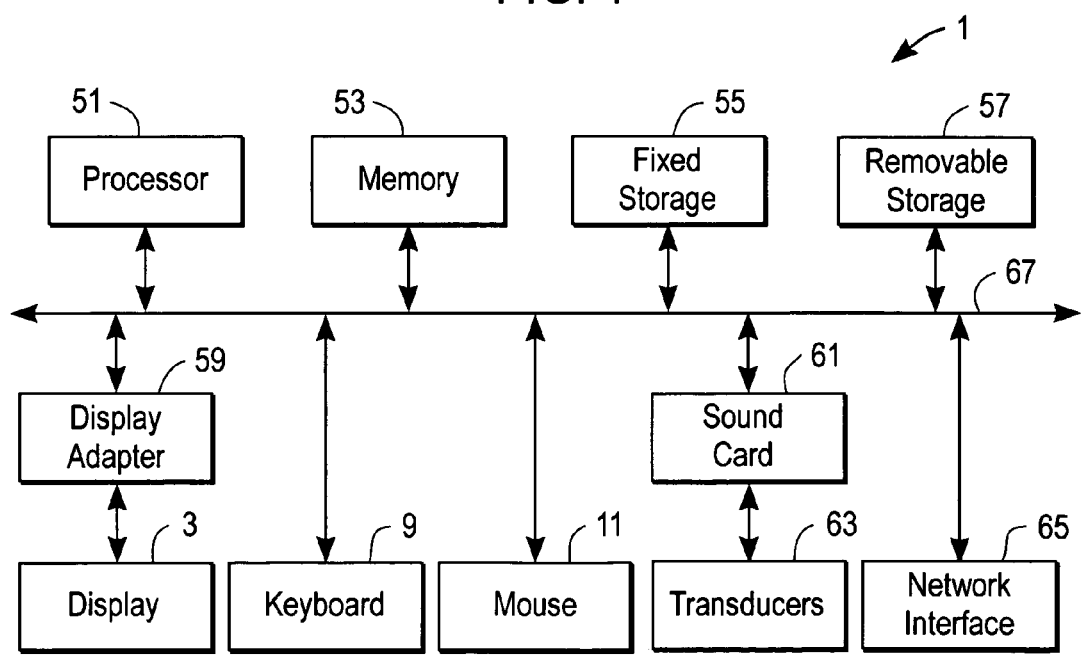
FIG. 2 illustrates a system block diagram of the computer system of FIG. 1.

FIG. 2 shows a system block diagram of computer system 1 used to execute software of an embodiment of the invention or use hardware embodiments. As in FIG. 1, computer system 1 includes monitor 3 and keyboard 9, and mouse 11. Computer system 1 further includes subsystems such as a central processor 51, system memory 53, fixed storage 55 (e.g., hard drive), removable storage 57 (e.g., CD-ROM drive), display adapter 59, sound card 61, transducers 63 (speakers, microphones, and the like), and network interface 65. The network interface may provide the communication to other computer systems or devices. There are other mediums through which there can be communication including wireless technologies. Other computer systems suitable for use with the invention can include additional or fewer subsystems. For example, another computer system could include more than one processor 51 (i.e., a multi-processor system) or a cache memory.

The system bus architecture of computer system 1 is represented by arrows 67. However, these arrows are illustrative of any interconnection scheme serving to link the subsystems. For example, a local bus could be utilized to connect the central processor to the system memory and/or display adapter. Computer system 1 shown in FIG. 2 is but an example of a computer system suitable for use with the invention. Other computer architectures having different configurations of subsystems can also be utilized.

Embodiments of the invention can also be implemented on devices that have different architectures than are shown in FIGS. 1 and 2. These devices can include small mobility devices such as cell phones, PDAs, palm top computers, and the like. Although these devices typically have fewer subsystems than shown and fewer resources (e.g., less memory), they operate on many of the same principles including a processor that executes instructions and stores data in some form of memory. Therefore, it should be understood that embodiments of the invention are not limited to the hardware architectures that are shown and can be advantageously be applied to other hardware architectures, especially those of smaller mobility devices.

Figure 3:
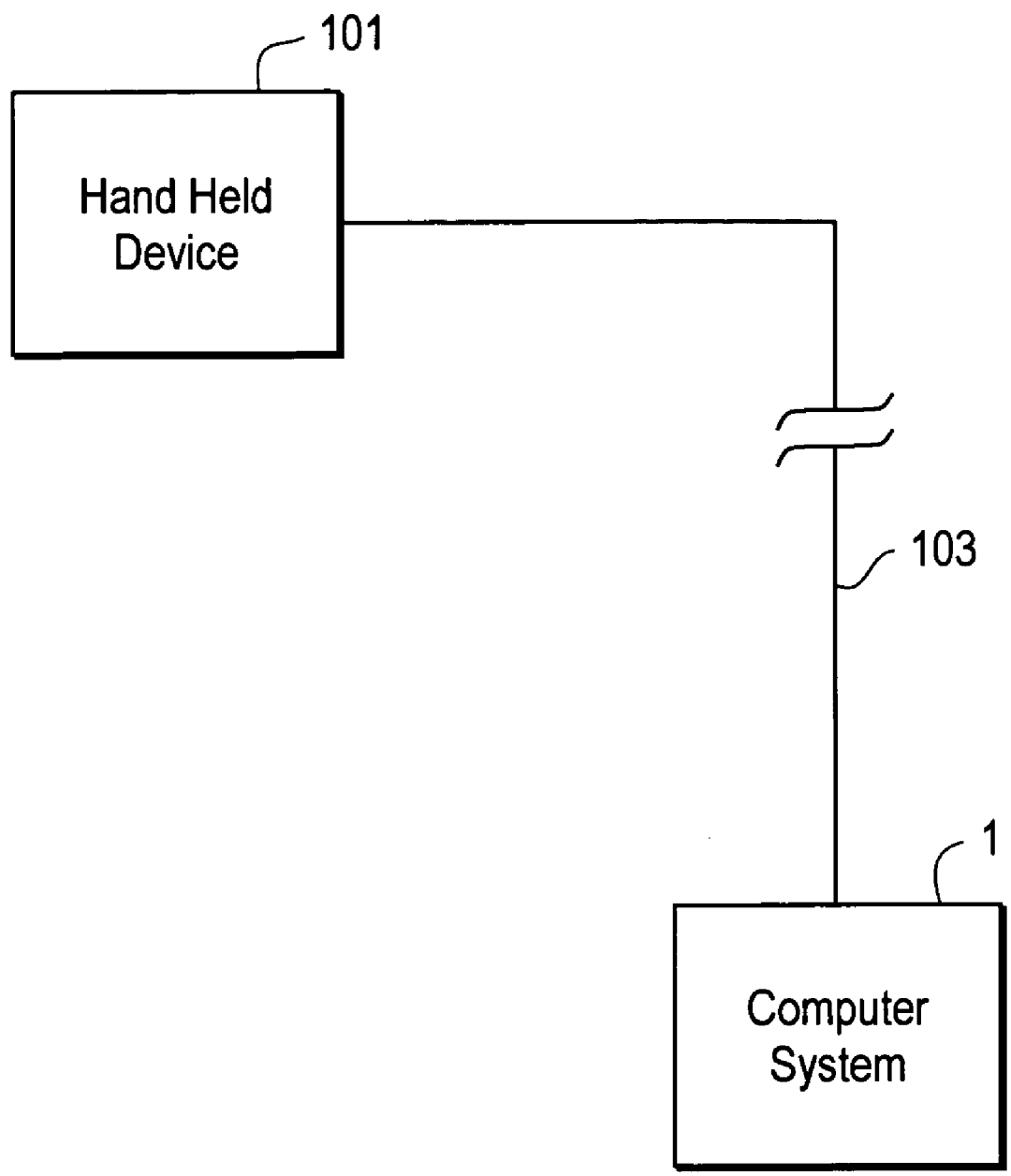
FIG. 3 shows a block diagram of a hand held device in communication with a computer system.

FIG. 3 shows a block diagram of a hand held device in communication with a computer system. A hand held device 101 is communicating with computer system 1 over a communication medium 103. As an example, hand held device 101 may be able to communicate with computer system 1 using a number of different protocol stacks. For example, the protocol stacks can enable Internet Protocol (IP) telephone communication, video exchange, application communication, or any other data exchange. The communication medium can be any medium including wire, optical, wireless, and the like.

Figure 4:
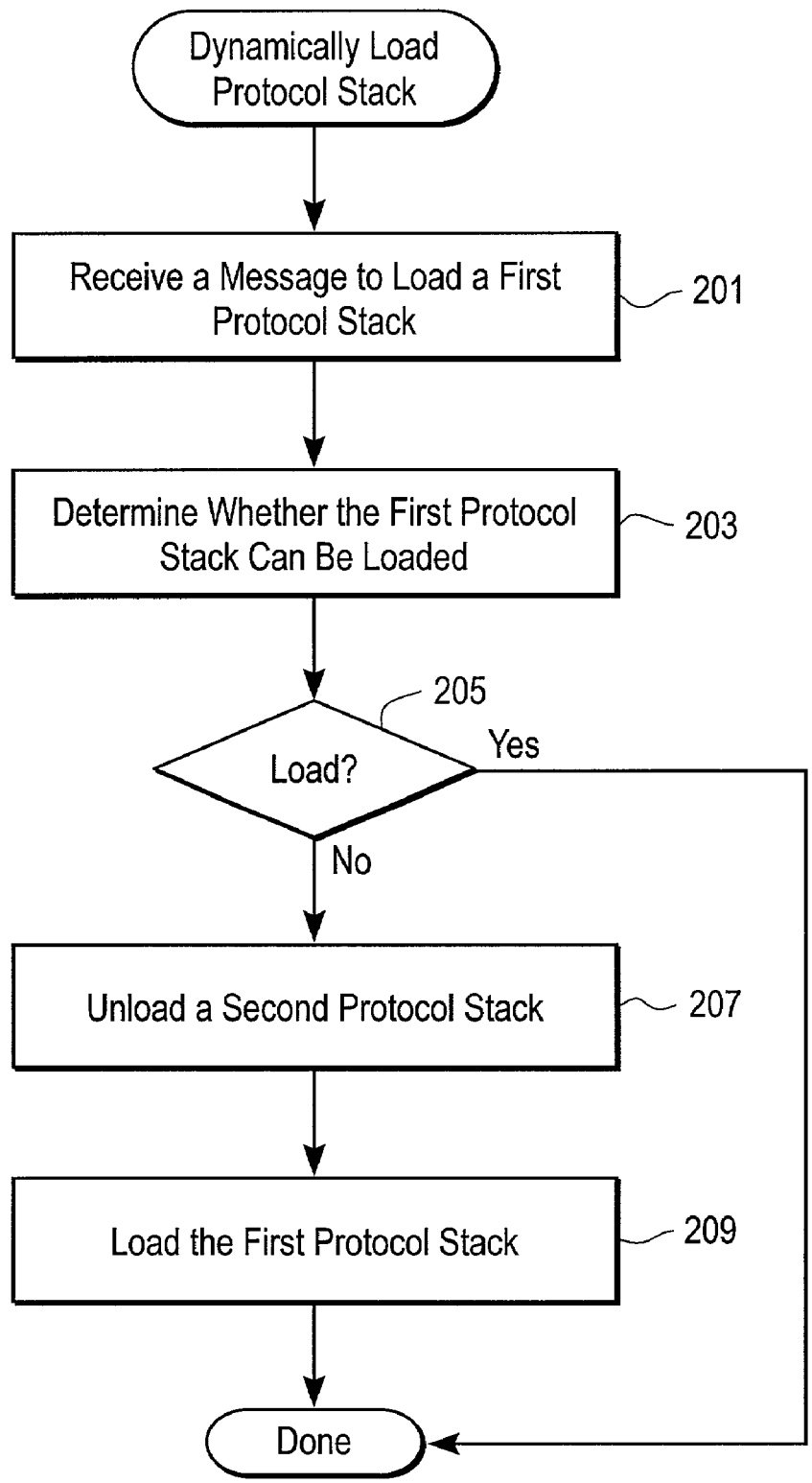
FIG. 4 shows a flowchart of a process of dynamically loading a protocol stack, in accordance with a specific embodiment of the invention.

Now that exemplary hardware has been described, it may be beneficial to describe a software implementation of an embodiment of the invention. The following will be described in reference to a computer system, but it is equally applicable to other devices. FIG. 4 shows a process of dynamically loading a protocol stack, according to a specific embodiment. At a step 201, a message is received to load a first protocol stack. The message is a signal to the computer system that another computer system or device would like to communicate using the specified protocol stack. In preferred embodiments, these messages can be sent to load or unload protocol stacks and they can also include other information as desired. The message can specify that the entire protocol stack should be loaded or that only certain executables of the protocol stack should be loaded (e.g., through use of a bitmap in the message). Similarly, a message can specify that the entire protocol stack or only certain executables of the protocol stack should be unloaded.

At a step 203, it is determined whether the first protocol can be loaded. Determining whether the first protocol stack can be loaded can include an analysis of one or more factors. For example, the available memory may be checked to determine if there is enough available to load the first protocol stack. As another example, the protocol stacks that are already loaded may be checked to see if any of them are incompatible with the first protocol stack. As will be described in more detail in reference to FIGS. 7 and 8, a database can be utilized to store information on protocol stacks.

If it is determined at a step 205 that the first protocol stack cannot be loaded, a second protocol stack is unloaded at a step 207. One or more factors may be analyzed to determine which protocol stack will be unloaded. These factors can include whether the protocol stack is being used, the amount of memory the protocol stack requires to be loaded, whether the protocol stack is compatible with the first protocol stack, and the like.

Once the second protocol stack is unloaded, the first protocol stack is loaded at a step 209. As shown, if it is determined at step 205 that the first protocol stack can be loaded, the flow proceeds to step 209 where the first protocol stack is loaded. A high level flow of one embodiment has been described in reference to FIG. 4. The following paragraphs provide further details on this and other embodiments.

Figure 5:
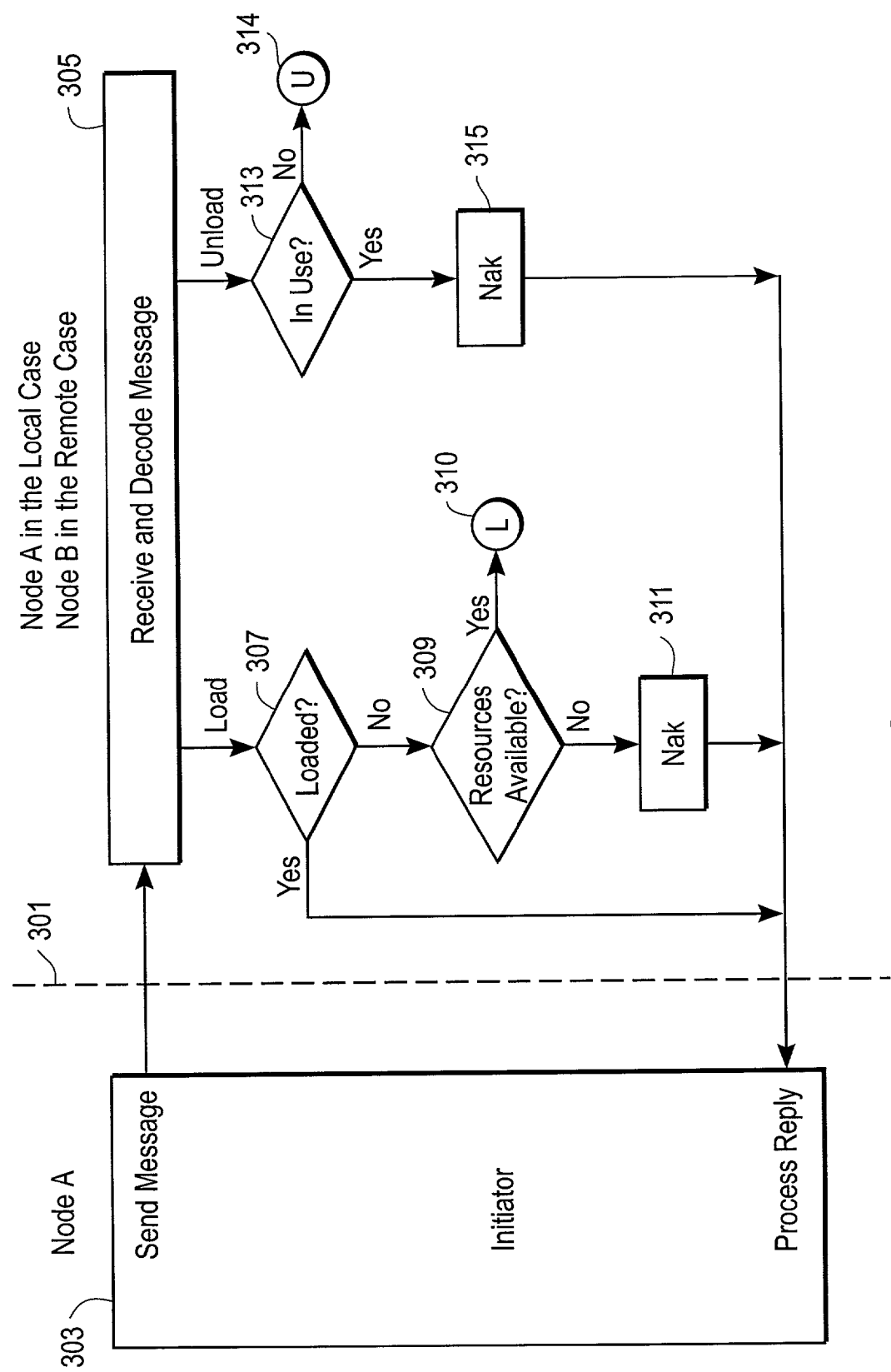
FIG. 5 shows a flowchart of a process of sending a message from one node to another to load a protocol stack, in accordance with a specific embodiment of the invention.

FIG. 5 shows a flowchart of a process of sending from one node to another a message to load a protocol stack, according to the present invention. In one embodiment, communication between two nodes includes two very similar stages. Assume that node A desires to communicate with node B utilizing a protocol stack. Initially, node A may send itself a message to load the desired protocol stack. If the protocol stack is or becomes loaded on node A, node A then sends a message to node B to load the desired protocol stack. If the protocol stack is or becomes loaded on node B, communication using the desired protocol stack can proceed.

The high level flow for both the local case where node A sends a message to itself to load the protocol stack and the remote case where node A sends a message to node B to load the protocol stack is shown in FIG. 5. Dashed line 301 indicates the division of actions that are performed by each node. The line between the nodes on this figure, divided by dashed line 301, represents a communication channel over which messages may be passed. For ease of illustration, the actions to the left of dashed line 301 are specified as being performed by node A and actions to the right of dashed line 301 are specified as being performed by node A in the local case or node B in the remote case.

Node A is shown to include a software initiator 303 that sends a message to load or unload a protocol stack. The message to load or unload a protocol stack is received and decoded at a step 305. As mentioned previously, step 305 (and subsequent steps) may be performed by node A in the local case and node B in the remote case.

If the decoded message indicates that a protocol stack is to be loaded, it is determined at a step 307 whether the protocol stack is already loaded. If the protocol stack is already loaded, a message such as an Ack (acknowledgement, meaning that the protocol stack has been loaded) may be sent to initiator 303 to process the reply.

Otherwise, if the protocol stack is not already loaded, it is determined at a step 309 whether sufficient resources (e.g., memory) are available to load the protocol stack. Further description of checking for available resources will be described in reference to FIG. 6. If sufficient resources are available, the protocol stack is loaded at a step 310. A process for loading a protocol stack will be described in more detail in reference to FIG. 7.

If sufficient resources are not available to load the protocol stack, a message such as a Nak (negative acknowledgement, meaning that the protocol stack has not been loaded) may be sent to initiator 303 at a step 311.

The above has described the process for a message to load a protocol stack. For a message to unload a protocol stack, it is determined if the protocol stack is in use at a step 313. If the protocol stack is not in use, the protocol stack is unloaded at a step 314. A process for unloading a protocol stack will be described in more detail in reference to FIG. 8.

Otherwise, if the protocol stack is in use, a message such as a Nak (negative acknowledgement, meaning that that protocol stack has not been unloaded) may be sent to initiator 303 at a step 315.

One of the advantages of the embodiment shown in FIG. 5 is that the same process can be utilized for the local and remote cases. However, other embodiments can vary the processes to suit the specific application or environment. Therefore, the invention is not limited to the embodiments shown.

Figure 6:
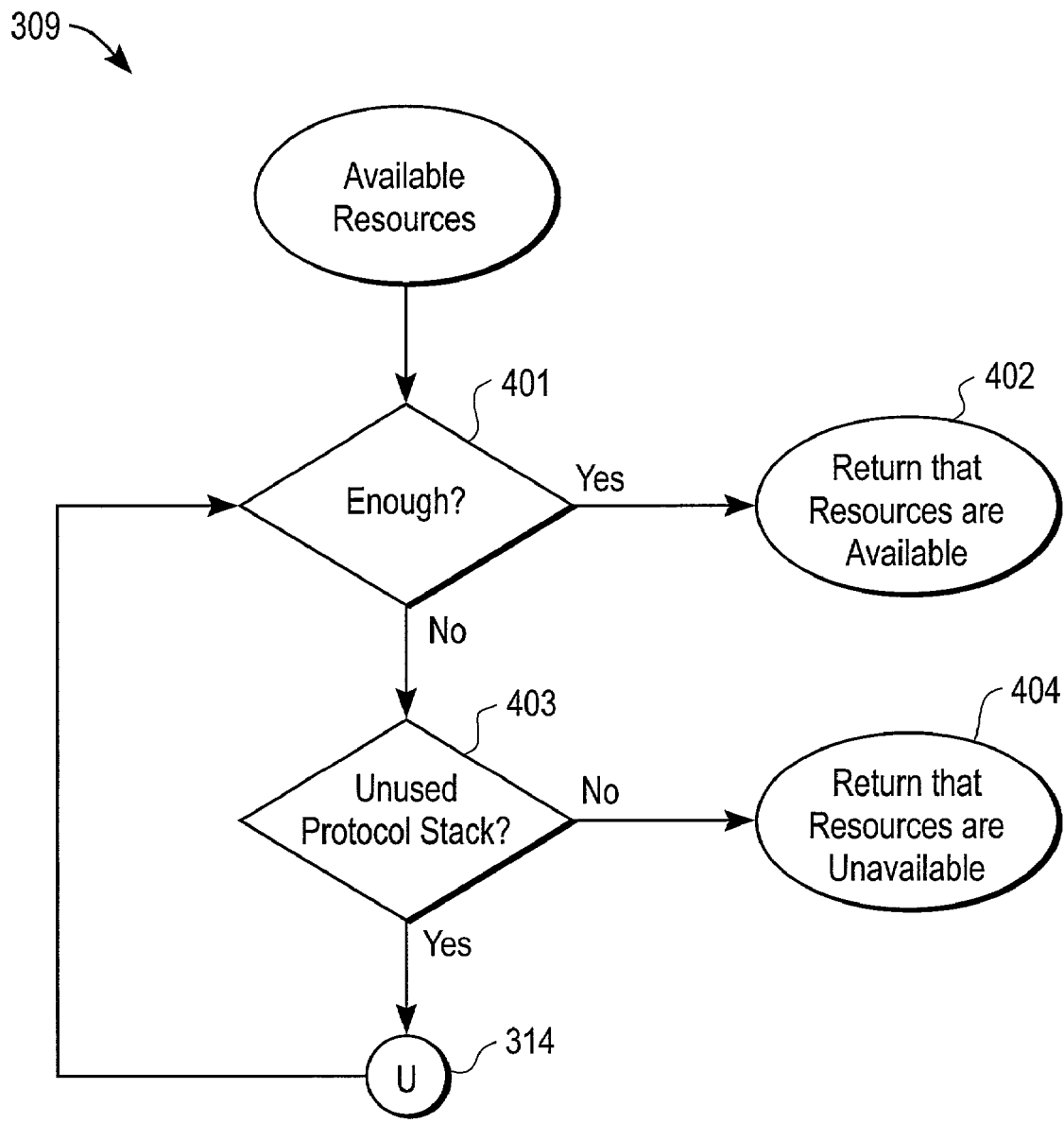
FIG. 6 shows a flowchart of a process of determining if resources are available to load a protocol stack and attempting to unload a protocol stack if enough resources are not available, in accordance with a specific embodiment of the invention.

FIG. 6 shows a process of determining if resources are available to load a protocol stack, in accordance with a specific embodiment. The process can be incorporated into step 309 of FIG. 5. At a step 401, it is determined if sufficient resources are available to load the protocol stack. If enough resources are available, the process can return that resources are available to load the protocol stack at a step 402.

If sufficient resources are not available, it can be determined if there is an unused protocol stack that is currently loaded at a step 403. If there are no unused protocol stacks that are loaded, the process can return that resources are unavailable to load the protocol stack at a step 404. Otherwise, if there is an unused protocol stack that is loaded, that protocol stack can be unloaded at step 314. The flow can return to step 401 to determine if there are now sufficient resources to load the protocol stack.

Figure 7:
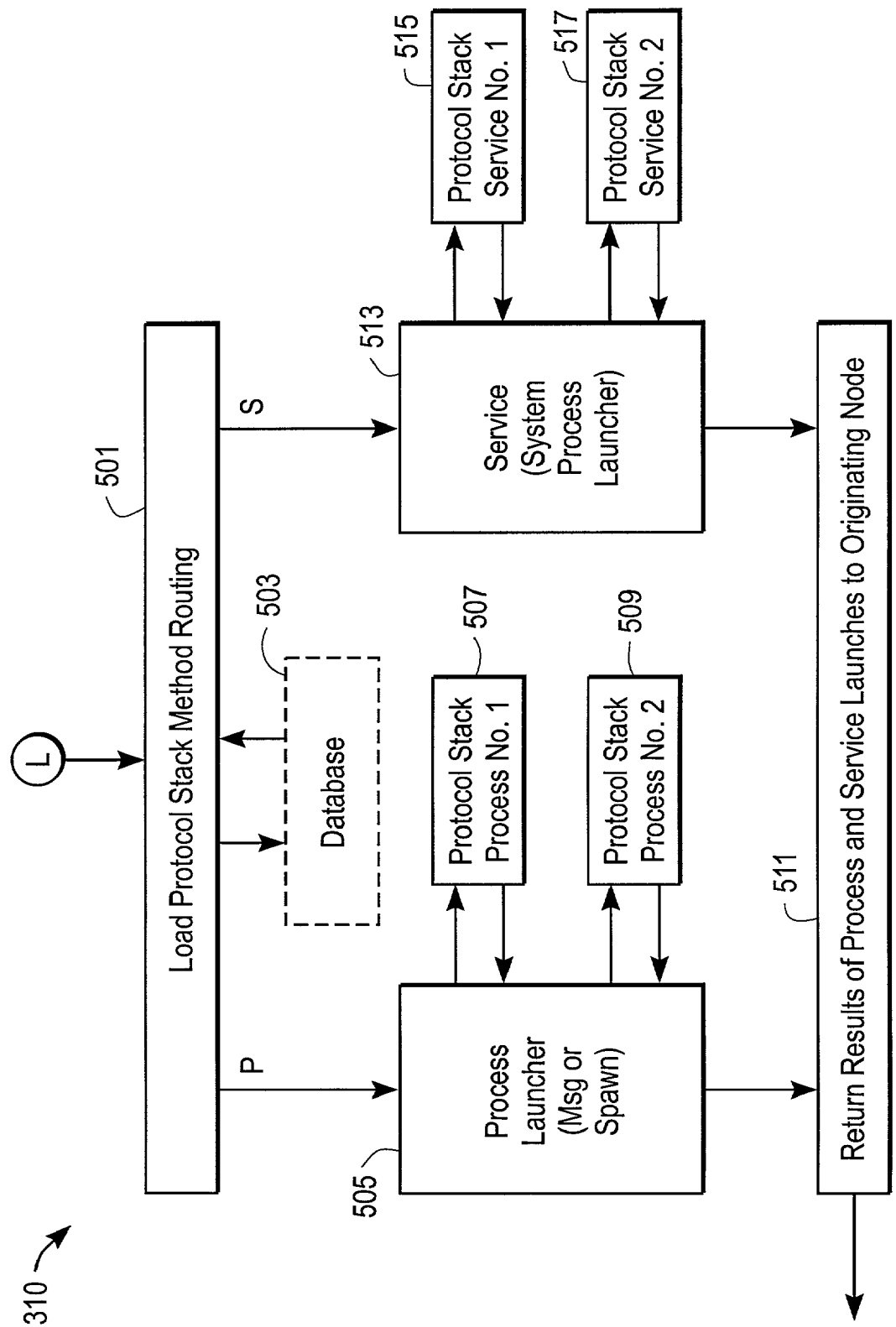
FIG. 7 shows a flowchart of a process of loading a protocol stack according to database procedures specified in a database, in accordance with a specific embodiment of the invention.

According to specific embodiments, FIG. 7 shows a flowchart of a process of loading a protocol stack that can be incorporated into step 310. At a step 501, the procedure for loading the protocol stack is determined. In a preferred embodiment, a database 503 is maintained that includes the procedures for loading specific protocol stacks. The database can also include other information such as the resources that the a protocol stack requires to be loaded, protocol stacks that are incompatible, a subset of executables that should be loaded for the protocol stacks, and the like.

Some protocol stacks are loaded by launching a process and others by launching a service (which on some operating systems is called a system process). If the procedures from database 503 indicate that the protocol stack should be loaded by launching a process, a process launcher 505 launches a process 507 to load the protocol stack. Another process 509 is shown that may be launched to load the same or different protocol stack. Launching a process may be done directly or by sending the appropriate message to the application with responsibility for launching the process. At a step 511, the results of the process launches (and service launches as will be described in the following paragraphs) can be returned to the originating node.

For protocol stacks that are loaded by launching a service, a service launcher 513 launches a service 515 to load the protocol stack. Another service 517 is shown that may be launched to load the same or different protocol stack. At a step 511, the results of the service launches can be returned to the originating node.

Figure 8:
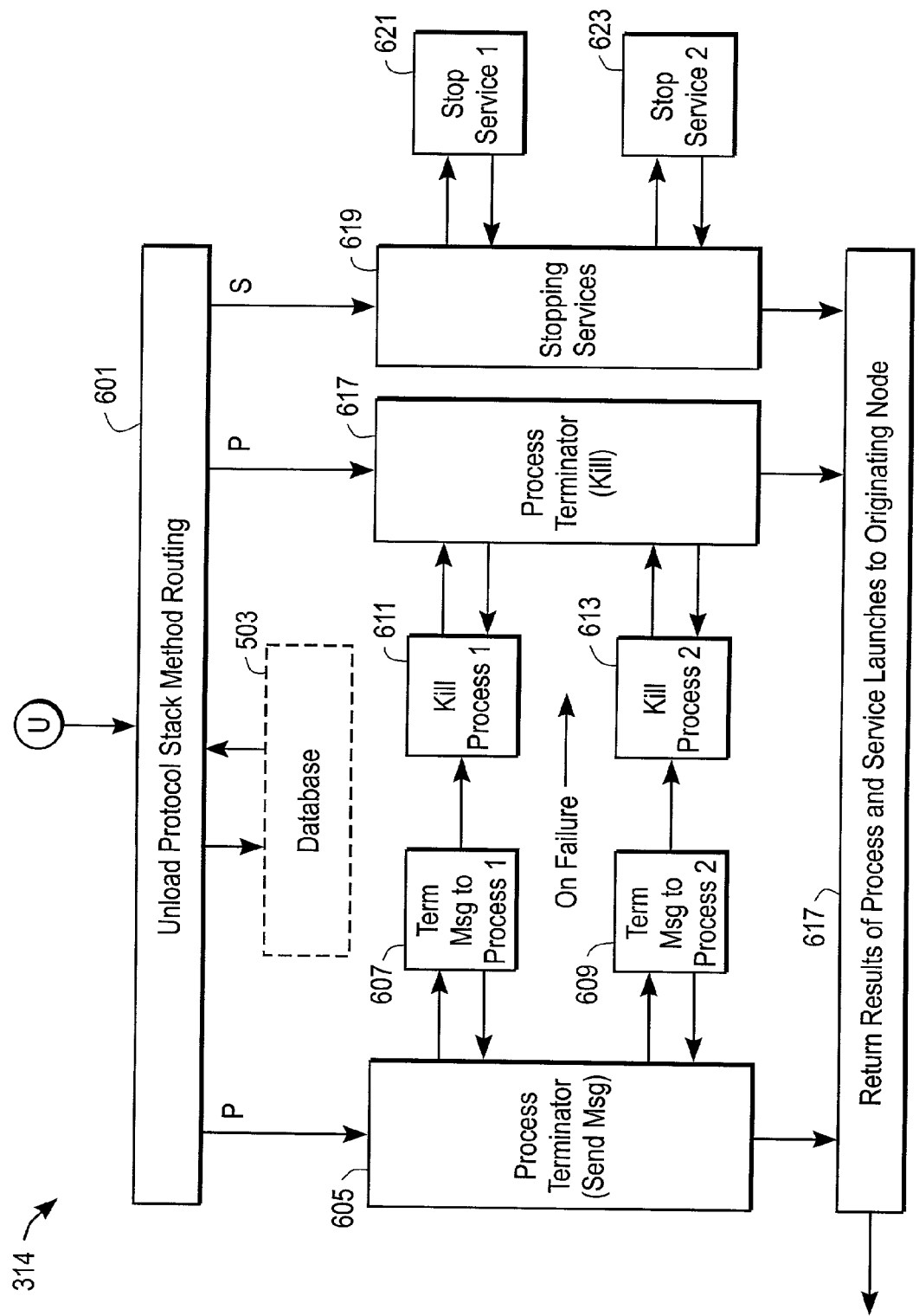
FIG. 8 shows a flowchart of a process of unloading a protocol stack according to procedures specified in a database, in accordance with a specific embodiment of the invention.

According to specific embodiments, FIG. 8 shows a flowchart of a process of unloading a protocol stack that can be incorporated into step 314. At a step 601, the procedure for unloading the protocol stack is determined. The procedures for unloading a specific protocol stack can be stored in database 503. Protocol stacks can be unloaded many different ways and may depend on whether the protocol stack was loaded using a process or a service. For example, protocol stacks may be unloaded by sending a message to the process to terminate, killing the process, stopping the service, and others depending on the operating system and protocol stack. The following will describe a few ways of unloading a protocol stack that is illustrative of the techniques that can be utilized.

If the protocol stack was loaded using a process, the procedure to unload the protocol stack may be to send a message to the process to terminate. As shown, a process terminator 605 sends a terminate message 607 to the process. A terminate message 609 is also shown that can be sent to a process to unload a different or same protocol stack. Typically, the process will receive the terminate message and shut itself down, thereby unloading the protocol stack.

If the terminate message does not unload the protocol stack, the process may be killed at a step 611 (or a step 613). It may be preferable to have the process terminate itself, but on failure to do that, the process may be killed. The procedure for unloading a protocol stack may specify killing the process so a process terminator 615 may be utilized to kill the process using steps 611 or 613. The results of process and terminations can be sent to the originating node at a step 617.

Protocol stacks that are unloaded by stopping a service can utilize a stopping services routine 619. The services can be stopped at steps 621 or 623 as shown. The results of stopping the services can be returned to the originating node at step 617.

Figure 9:
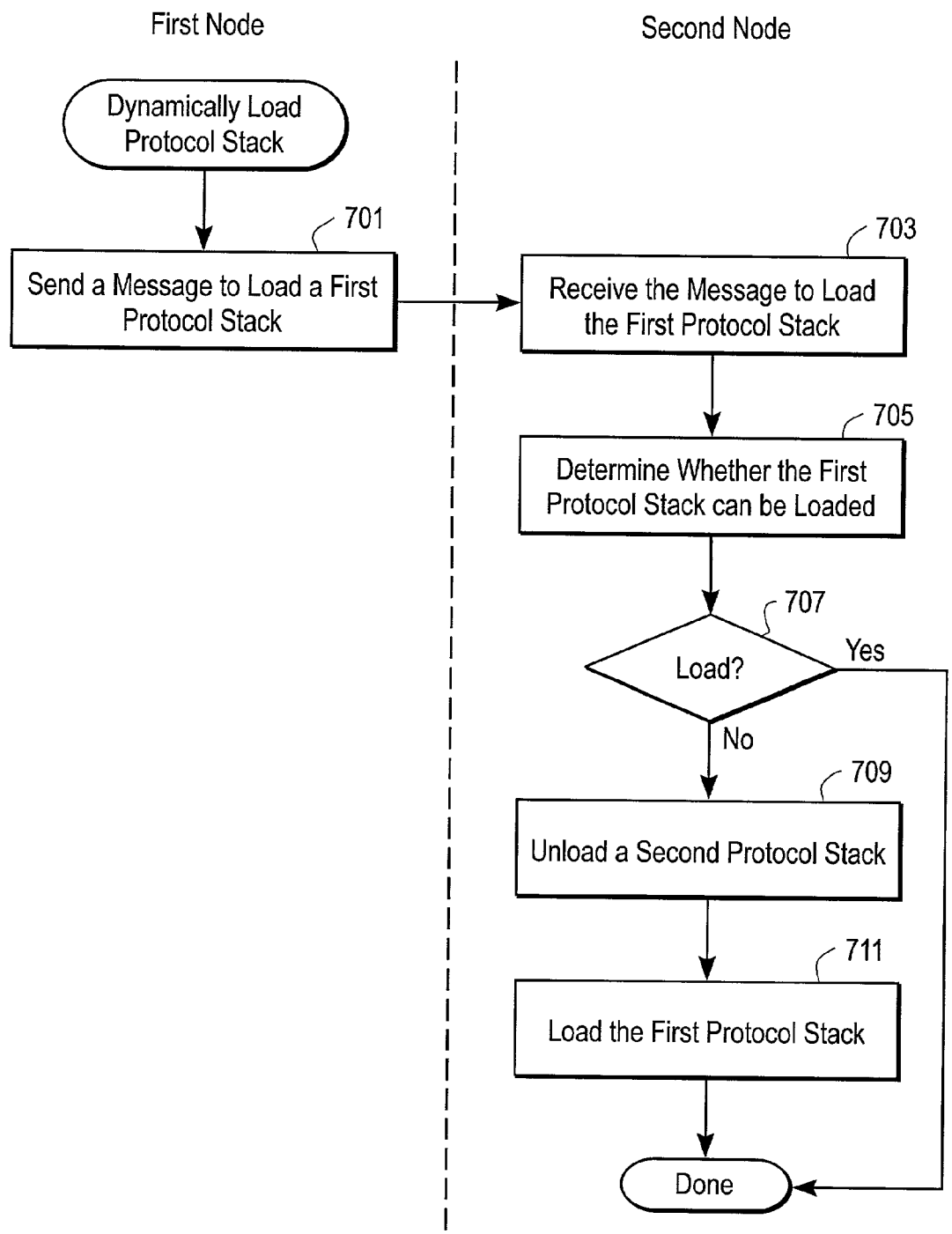
FIG. 9 shows a flowchart of a process of dynamically loading a protocol stack upon signaling control from a first node to a second node, in accordance with a specific embodiment of the invention.

FIG. 9 shows a flowchart of a process of dynamically loading a protocol stack upon signaling control from a first node to a second node. At a step 701, a message to load a first protocol stack is sent to a second node. As discussed previously, the first and second nodes may be in different devices (or computer systems) or the same nodes in a single device.

At a step 703, the message to load the first protocol stack is received. It is determined whether the first protocol stack can be loaded at a step 705. If it is determined that the first protocol stack cannot be loaded at a step 707, a second protocol stack is unloaded at a step 709 and the first protocol stack is loaded at a step 711.

If it is determined that the first protocol stack can be loaded at step 705, the first protocol stack is directly loaded at step 711. In other embodiments, the flowchart of FIG. 9 is augmented to include other features such as determining if protocol stacks are compatible, accessing a database for procedures for loading/unloading the protocol stacks, accessing a database to determine resource requirements of the protocol stacks, and the like.

A preferred embodiment for this invention is an implementation as part of a Supplementary Services data channel, either as part of H.450 or some competing protocol. Other preferred embodiments may be for the invention to be the basis for an extremely lightweight standard protocol dedicated to the sole purpose of loading and unloading other protocols.

The preceding has described embodiments of the invention in detail, but it may be beneficial to provide some examples of situations where the invention can be advantageously applied. The following paragraphs will describe a couple of examples.

As a first scenario, a shopper goes a store and takes her palmtop portable computer with her to use to consult with her spouse on an upcoming purchase who stays home. Once in the store the shopper establishes a wireless IP telephony voice link to the spouse through the palmtop. Because the palmtop has insufficient memory to support both voice and application sharing at the same time, when they try to set up an application sharing link to browse a web-based catalog together to look at alternatives to the purchase, they are advised the voice link will need to be interrupted. With an embodiment of the invention, the H.323 voice protocol stack can be unloaded on both ends of the connection and then the application sharing T.120 stack can be loaded on both ends. When they are finished browsing the catalog, the T.120 stack can be unloaded and the H.323 voice protocol stack reloaded.

To load and unload these stacks, the processes shown in the flowcharts can be performed on both local and remote nodes. For this particular scenario, it is assumed that the embodiment of the invention does not use an H.323 channel for signaling so that the protocol stack can be unloaded. Through this more intelligent use of memory, coordinated across a datacom link makes possible more functionality than would be possible with known techniques.

As a second scenario, consider two people conversing using IP telephony soft phones at both ends. Neither soft phone has a video capability, but like many soft phones, both support application sharing by using Microsoft's T.120 NetMeeting stack. Both use another third party for H.323 voice communication, which is also common. Even when application sharing is not being used, as in this case, Microsoft's T.120 NetMeeting stack (or portions thereof) needs to be loaded in order to respond to data call requests. The participants in this call decide they wish to add a video to their interaction and both are familiar with Microsoft's NetMeeting because it is a free utility on their desktop Windows system.

However, NetMeeting cannot be launched on either system without hanging up their voice call, because some NetMeeting components have already been loaded to handle application sharing. These NetMeeting components may have been loaded in order to answer potential data calls. An embodiment of the invention can be used to programmatically unload NetMeeting from both ends for the application sharing purposes that are not being used and reload it for video purposes with the NetMeeting GUI this time. The embodiment can also be used to unload the video and the Microsoft NetMeeting GUI when done and reload NetMeeting in the background to handle application sharing requests. Note that there is no longer any need to hang up the voice link or exit from the original application. With the invention, an enormous improvement in the user interface experience for this scenario can be accomplished. This improvement can be applied to many other scenarios that involve some sort of protocol stack use conflict.

While the above is complete description of an exemplary embodiment of the invention, various alternatives, modifications and equivalents can be used. It should be evident that the invention is equally applicable by making appropriate modifications to the embodiments described above. For example, the techniques described above were utilized to dynamically load networking protocol stacks but the invention can also be advantageously applied to other fields such as telecommunication protocol stacks. Therefore, the above description should not be taken as limiting the scope of the invention that is defined by the metes and bounds of the following claims along with their full scope of equivalents.

What is claimed is:

1. A computer implemented method of dynamically loading protocol stacks, comprising:
   receiving a message to load a first protocol stack;
   determining whether the first protocol stack can be loaded;
   selecting a second protocol stack to be unloaded, wherein selecting the second protocol stack to be unloaded includes selecting the second protocol stack to be unloaded from a plurality of protocol stacks, the plurality of protocol stacks not including the first protocol stack;
   unloading the second protocol stack if the first protocol stack cannot be initially loaded; and
   loading the first protocol stack.

2. The method of claim 1, wherein the first protocol stack cannot be initially loaded because memory was not available to load the first protocol stack.

3. The method of claim 1, wherein the first protocol stack cannot be initially loaded because the first and second protocol stacks are not compatible.

4. The method of claim 3, further comprising accessing a database to determine that the first and second protocol stacks are not compatible.

5. The method of claim 1, further comprising accessing a database for procedures for loading the first protocol stack.

6. The method of claim 1, further comprising accessing a database for procedures for unloading the second protocol stack.

7. The method of claim 1, wherein the first protocol is loaded by launching a process or launching a service.

8. The method of claim 1, wherein the second protocol is unloaded by sending a message to a process, killing a process or stopping a service.

9. The method of claim 1, wherein the message specifies portions of the first protocol stack that are to be loaded.

10. The method of claim 1 wherein selecting the second protocol stack to be unloaded includes at least one of determining when the second protocol stack is in use, determining an amount of memory the second protocol stack needs to be loaded, and determining whether the second protocol stack is compatible with the first protocol stack.

11. The method of claim 1 wherein the second protocol stack is not in use when determining whether the first protocol stack can be loaded.

12. A computer program product that dynamically loads protocol stacks, comprising:
    computer code that receives a message to load a first protocol stack;
    computer code that determines whether the first protocol stack can be loaded;
    computer code that unloads a second protocol stack if the first protocol stack cannot be initially loaded;
    computer code that selects a second protocol stack to be unloaded, wherein the computer code that selects the second protocol stack to be unloaded includes computer code that selects the second protocol stack to be unloaded from a plurality of protocol stacks, the plurality of protocol stacks not including the first protocol stack;
    computer code that loads the first protocol stack; and
    a computer readable medium that stores the computer codes.

13. The computer program product of claim 12, wherein the computer readable medium is a CD-ROM, floppy disk, tape, flash memory, system memory, or hard drive.

14. A system, comprising:
    a processor; and
    a computer readable medium storing a computer program including computer code that receives a message to load a first protocol stack, computer code that determines whether the first protocol stack can be loaded, computer code that selects a second protocol stack to be unloaded from a plurality of protocol stacks, computer code that unloads the second protocol stack if the first protocol stack cannot be initially loaded, and computer code that loads the first protocol stack.

15. The system of claim 14, wherein the computer readable medium is a CD-ROM, floppy disk, tape, flash memory, system memory, or hard drive.

16. A computer implemented method of dynamically loading protocol stacks, comprising:
    a first node sending a message to a second node to load a first protocol stack;
    the second node receiving the message to load the first protocol stack;
    the second node determining whether the first protocol stack can be loaded;
    the second node selecting a second protocol stack to be unloaded from a plurality of protocol stacks;
    the second node unloading the second protocol stack if the first protocol stack cannot be initially loaded on the second node; and
    the second node loading the first protocol stack.

17. The method of claim 16, wherein the first and second nodes are in different devices.

18. The method of claim 16, wherein the first and second nodes are the same node in a single device.

19. The method of claim 16, wherein the first protocol stack cannot be initially loaded on the second node because memory was not available to load the first protocol stack.

20. The method of claim 16, wherein the first protocol stack cannot be initially loaded on the second node because the first and second protocol stacks are not compatible.

21. The method of claim 20, further comprising accessing a database to determine that the first and second protocol stacks are not compatible.

22. The method of claim 16, further comprising accessing a database for procedures for loading the first protocol stack on the second node.

23. The method of claim 16, further comprising accessing a database for procedures for unloading the second protocol stack on the second node.

24. The method of claim 16, wherein the first protocol is loaded on the second node by launching a process or launching a service.

25. The method of claim 16, wherein the second protocol is unloaded on the second node by sending a message to a process, killing a process or stopping a service.

26. The method of claim 16, wherein the message specifies portions of the first protocol stack that are to be loaded on the second node.

27. A computer program product that dynamically loads protocol stacks, comprising:
    computer code that sends a message from a first node to a second node to load a first protocol stack;
    computer code that receiving the message to load the first protocol stack on the second node;
    computer code that determines whether the first protocol stack can be loaded on the second node;
    computer code that selects a second protocol stack from a plurality of protocol stacks;
    computer code that unloads the second protocol stack on the second node if the first protocol stack cannot be initially loaded on the second node;
    computer code that loads the first protocol stack on the second node; and
    a computer readable medium that stores the computer codes.

28. The computer program product of claim 27, wherein the computer readable medium is a CD-ROM, floppy disk, tape, flash memory, system memory, or hard drive.

29. A system, comprising:
a first node that sends a message to a second node to load a first protocol stack; and
the second node that receives the message to load the first protocol stack, determines whether the first protocol stack can be loaded, unloads a second protocol stack if the first protocol stack cannot be initially loaded on the second node, and loads the first protocol stack.

* * * * *